TELEVISION TEST SIGNAL GENERATOR

Filed June 2, 1947 5 Sheets-Sheet 1

INVENTORS: S. DOBA, JR.
J. J. JANSEN
BY E. V. Griggs
ATTORNEY

INVENTORS: S. DOBA, JR.
J. J. JANSEN
BY E. V. Griggs
ATTORNEY

INVENTORS: S. DOBA, JR.
J. J. JANSEN
BY E. V. Griggs
ATTORNEY

May 6, 1952 S. DOBA, JR., ET AL 2,595,646

TELEVISION TEST SIGNAL GENERATOR

Filed June 2, 1947 5 Sheets-Sheet 4

INVENTORS: S. DOBA, JR.
J. J. JANSEN

BY Hugh S. Wertz

ATTORNEY

May 6, 1952 S. DOBA, JR., ET AL 2,595,646

TELEVISION TEST SIGNAL GENERATOR

Filed June 2, 1947 5 Sheets-Sheet 5

INVENTORS: S. DOBA, JR.
J. J. JANSEN

BY Hugh S. Wertz
ATTORNEY

Patented May 6, 1952

2,595,646

UNITED STATES PATENT OFFICE 2,595,646

TELEVISION TEST SIGNAL GENERATOR

Stephen Doba, Jr., Long Island City, N. Y., and Johannes J. Jansen, Brookside, N. J., assignors to Bell Telephone Laboratories, Incorporated, New York, N. Y., a corporation of New York Application June 2, 1947, Serial No. 751,676

4 Claims. (Cl. 175—183)

This invention relates to the testing of broad band transmission circuits and more particularly apparatus whereby the transmission characteristics of a television transmission system may be determined rapidly and with a minimum of ancillary equipment.

It is an object of the invention to provide apparatus for making rapid and comprehensive tests of broad band transmission systems.

It is an object of the invention to provide means for the performance testing of television circuits and systems.

It is a further object of the invention to provide equipment for the visual estimation and evaluation of the transmission and phase characteristics of wide band transmission circuits by means of artificially generated television signals.

It is another object of the invention to provide means for visually determining the effect of circuit noise in a television transmission system upon the wave shape of television synchronizing signals transmitted by the system.

In the performance testing of transmission circuits having wide pass bands for use in the transmission of television signals, it is necessary to determine the transmission and phase characteristics, the transient response, and the effect of noise interference upon the synchronizing signals. Heretofore it has been customary to perform each of these tests separately and under "static" or non-operational conditions. The transmission and phase characteristics of a system have been determined by measuring the complex system impedance at each of a series of frequencies throughout the frequency band to be transmitted. The use of rectangular waves to determine the transient response of a system at frequencies in the order of the picture frame scanning rate has long been known and recently the technique has been extended to determine system response to the higher frequency signal components which limit the detail of the transmitted picture. Finally, in order to correlate the measured circuit performance data, it has been customary to determine the dynamic or operational performance of the circuit by sending a standard picture over the television system. This last test provided the most satisfactory determination of over-all circuit performance since picture flaws produced by imperfect transmission were readily apparent and it was relatively simple to determine qualitatively whether distortions exceeded the allowable limits.

These testing procedures have, however, certain limitations. For example, they require a considerable amount of bulky equipment at either terminal of the system and a considerable amount of time in their performance. While these considerations may be unobjectionable in the laboratory, in commercial practice it is necessary that the test equipment be light and portable and that the test procedures provide a rapid estimate of circuit performance. Finally, in the dynamic testing of circuit performance by means of standard pictures, it has been found that no single picture or group of pictures is satisfactory for critically examining all the transmission and interference factors.

As a means of avoiding these difficulties, there is provided in accordance with the invention equipment for forming a test signal which appears on the face of a cathode ray monitor tube as a well defined picture area of adjustable dimensions and position within a picture field of a differing shade. In one embodiment of the invention, the test signal is a composite signal in which the picture signal in the interval between horizontal synchronizing pulses is normally of an amplitude corresponding to picture black but interrupted by a rectangular wave of an amplitude corresponding to picture white. Such a test signal would produce a white picture area of a rectangular shape within a black picture field upon the face of the monitor tube when transmitted by an adequate circuit.

This test signal of the invention is useful in making a rapid evaluation of the transmission characteristics of wide band transmission circuits. Defective transmission of the test signal will appear as characteristic defects in the picture area displayed upon the monitor tube. For example, inadequate transient response of the system will produce a series of bright lines associated with the vertical edges of the picture while phase distortion at line scanning frequency will appear as a horizontal stripe across the picture field. Furthermore it is possible by a variation of the size and position of the picture to accentuate or decrease the effect of the circuit transmission irregularities so as to obtain a roughly quantitative measure of the irregularity.

It is an important feature of the invention that the test signal is generated entirely by electronic means so that the test equipment may be made highly compact and easily portable. It is another important feature of the invention that a qualitative evaluation of the operational performance of a television transmission system may be obtained in a minimum of time.

The invention will be more fully understood by reference to the specific embodiment illustrated in the drawing and the following description thereof. In the drawings.

Figure 1:
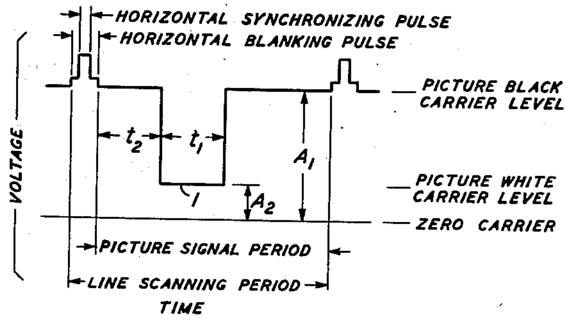
Fig. 1 is a diagrammatic representation of a single horizontal scanning line of the composite test signal.

Referring now specifically to Fig. 1, there is shown a diagrammatic representation of a horizontal scanning line of the composite test signal produced by the signal generator of the present invention. The test signal may preferably be formed in accordance with the standards set forth by the National Television System Committee, particularly with respect to the characteristics of the horizontal blanking and synchronizing pulses and the proportionate length of the picture signal period, but only from the standpoint of maximum usefulness in the employment of the invention.

The picture signal of the composite test signal is characterized in that there is formed a picture pulse 1 of essentially rectangular waveform in which there is an abrupt transition from a reference voltage level of an amplitude A1 to a second voltage level of an amplitude A2 and a return to the reference level. While the use of a reference voltage level equivalent to picture black and a picture pulse voltage level equivalent to picture white as is shown in Fig. 1 is by no means necessary, such voltage levels provide a maximum of information concerning the transmission circuit under test when the circuits are intended for the transmission of television signals.

Figure 2:
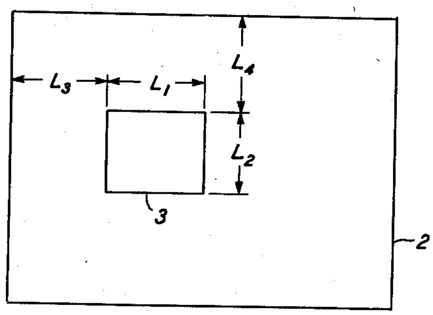
Fig. 2 is an illustration of the picture formed upon the face of a cathode ray monitor tube by the composite test signal.

There is shown in Fig. 2 a representation of the picture formed upon the face of a cathode ray monitor tube when the composite test signal of which Fig. 1 is a horizontal scanning line is applied to the beam deflection plates through the usual control and synchronizing circuits. The picture includes a picture field 2 of a shade dependent upon the reference voltage level of the picture signal and within the field a picture area 3 having characteristics determined by the voltage and phase characteristics of the applied picture pulse. More specifically, the size of the picture area is determined by the duration $t_1$ of the picture pulse, corresponding to the width L1 of the picture area, and the number of horizontal scanning lines in which the picture pulse is generated, corresponding to the height L2 of the picture area. The positioning of the picture area within the picture field is determined by the time interval $t_2$ between the horizontal blanking pulse and the picture pulse, corresponding to the horizontal positioning L3 and the time interval between the first horizontal scanning line of the picture field and the horizontal scanning line containing the first picture pulse, corresponding to the vertical positioning L4. The picture area of Fig. 2 is, of course, an idealized representation of the picture actually formed by the signal of Fig. 1, since the passage of the composite test signal through the circuits to be tested will cause characteristic amplitude and phase distortions of the picture pulse which appear as modifications of the shade and shape of the picture area.

It is to be understood that the use of a single picture pulse or series of pulses having a rectangular waveform is by no means necessary in the practice of the invention. The sequence of picture pulses may be varied so as to provide an interlaced or striated picture. The use of intermittent series of picture pulses so as to form a discrete series of picture areas will be understood to be within the scope and meaning of the invention.

Figure 3:
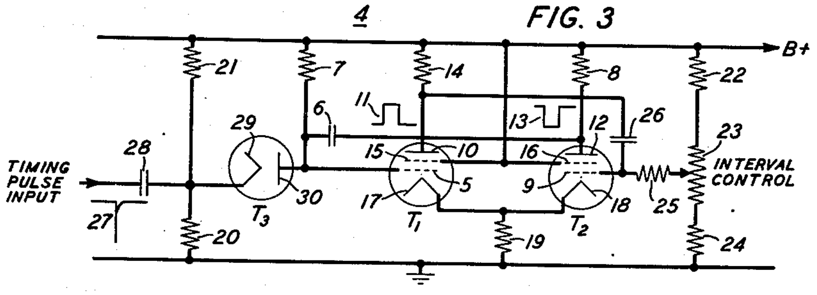
Fig. 3 is a circuit diagram of a multivibrator useful in the practice of the invention.

Before proceeding to the description of the test signal generator of the invention, reference will be made to Fig. 3 in which there is shown a multivibrator circuit 4 which may be utilized in the production of picture pulses in the illustrative embodiment of the invention. Briefly stated, the multivibrator circuit 4 comprises two amplifier tubes T1 and T2 connected in an unsymmetrical circuit, so that in the normal or quiescent state tube T1 is conducting and tube T2 is non-conducting. The application of a negative triggering pulse through diode T3 to a control grid 5 of tube T1 causes that tube to become non-conducting whereas tube T2 becomes conducting. The interval during which this condition exists is determined by the time constant of condenser 6 and resistors 7 and 8, and the bias on a control grid 9 of tube T2. As condenser 6 charges, the potential on the control grid 5 of tube T1 increases until it reaches the potential level of the control grid 9 of tube T2, when tube T1 again becomes conducting, thus restoring tubes T1 and T2 to their original condition. There is thus formed at the anode 10 of tube T1 a positive voltage 11 of essentially rectangular waveform and at the anode 12 of tube T2 a similar negative voltage pulse 13.

With reference now to a more detailed description of the multivibrator circuit 4, the anode 10 of tube T1 is connected through a resistor 14 to the positive pole of a source of anode voltage represented in the drawing as B plus. Similarly, anode 12 of tube T2 is connected through a resistor 8 to the same voltage source. The screen grids 15 and 16 of tubes T1 and T2, respectively, are connected directly to the source of anode voltage. Cathodes 17 and 18 of tubes T1 and T2 respectively are connected through a common cathode dropping resistor 19 to the negative pole of the source of voltage, represented in the drawing as a ground connection. The voltage on the control grid 5 of tube T1 is determined by the network comprising resistors 20 and 21. The cathode resistor 19 and the voltage on grid 5 of tube T1 determine the quiescent current in tube T1. This current is of a magnitude such that the voltage on cathode 17 of tube T1 is somewhat higher than the voltage on grid 5 and diode T3 is slightly conducting.

The bias potential applied to the grid 9 of tube T2 is determined by the network comprising a resistor 22, a potentiometer 23, and a resistor 24, the bias potential being such as to cause tube T2 to be normally non-conducting. A resistor 25 connected between potentiometer 23 and the control grid 9 of tube T2 serves as a grid isolating resistor. Potential variations at the anode 10 of tube T1 are coupled to the control grid 9 of tube T2 by means of a condenser 26, while potential variations at the anode 12 of tube T2 are impressed upon the control grid 5 of tube T1 by means of condenser 6.

The application of a negative synchronizing or timing pulse, such as that shown at 27, to a coupling condenser 28 will cause a sharp drop in the potential level of cathode 29 of tube T3. The increased conduction current between cathode 29 and anode 30 of tube T3 will cause an increased voltage drop through resistor 7 thus reducing the potential of grid 5 of tube T1 to some value below cut-off. The resultant sharp increase in the potential of anode 10 of tube T1 by reason of the greatly reduced voltage drop through resistor 14 is transmitted through condenser 26 to the control grid 9 of tube T2, causing a sharp decrease in the potential of the anode 12 by reason of the greatly increased voltage drop through the resistor 8. The potential decrease at the anode 12 is transmitted through condenser 6 to the control grid 5 of tube T1 so as to maintain the grid at a potential below cut-off upon the cessation of the negative timing pulse. Simultaneously condenser 6 starts to charge at a rate determined by the time constant of condenser 6 and resistor 7. Since the cathode potential of both tubes T1 and T2, while tube T2 is conducting, is determined by the potential of the grid 9 of tube T2, when condenser 6 acquires a sufficient charge to bring the potential level of grid 5 of tube T1 to that of grid 9 of tube T2, tube T1 will again become conducting. At the time when T1 again conducts, the potential of anode 10 drops sharply, and the negative impulse is transmitted to grid 9 of tube T2 which returns to the non-conducting state. The complete cycle of operation thus produces a positive pulse such as that represented at 11 at the anode 10 of tube T1 and a similar negative pulse 13 at the anode 12 of tube T2. The two pulses have an equal duration which is determined by the adjustment of the potentiometer 23, which may be termed an interval control.

Figure 4:
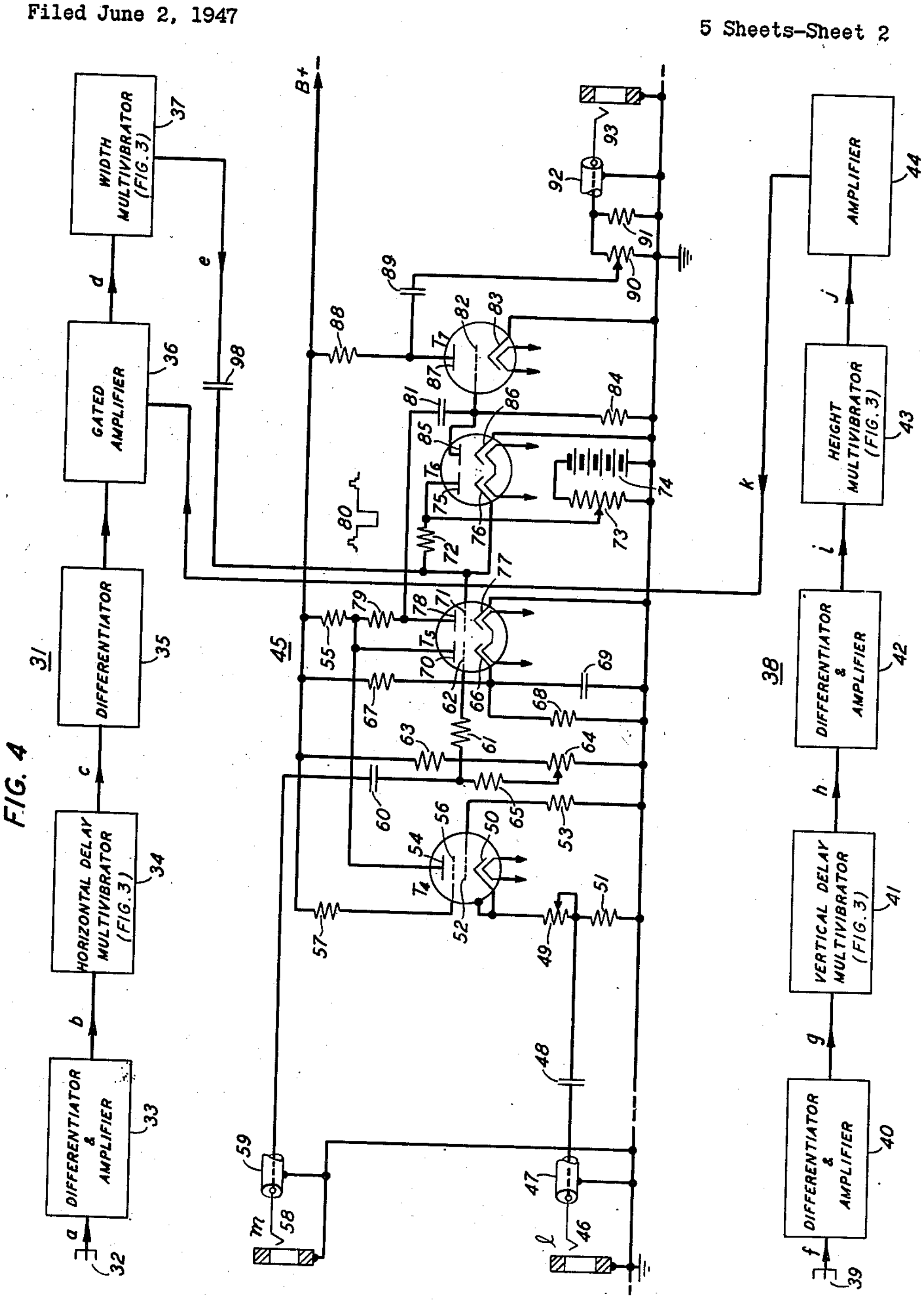
Fig. 4 is a schematic diagram of a specific embodiment of the signal generator of the invention.

With reference now to Fig. 4, there is illustrated in schematic diagram a specific embodiment of the test signal generator of the present invention. The embodiment shown is intended for use with an auxiliary control signal generator such as is known as the "RMA Synchronizing Generator" although such an arrangement is by no means necessary in the practice of the invention. The auxiliary control signal generator serves to provide a source of standard blanking and synchronizing signals, a series of timing signals at horizontal scanning frequency which may be denoted as "line timing pulses," and a series of timing signals at frame scanning frequency which may be denoted as "frame timing pulses." The nature of the pulses supplied by the auxiliary generator may be understood more clearly by reference to Fig. 5 in which curve *a* is representative of a series of timing pulses having a repetition rate at horizontal line scanning frequency; curve *f* is representative of a series of timing pulses having a repetition rate at vertical or frame scanning frequency; curve *l* is representative of a series of blanking pulses at horizontal line scanning frequency; and curve *m* is representative of a series of synchronizing pulses at horizontal line scanning frequency. It will be realized, of course, that the latter two representations include only the pulses generated by the external generator during the horizontal scanning interval and do not show the blanking and synchronizing pulses necessary during the vertical or frame blanking interval.

Figure 5:
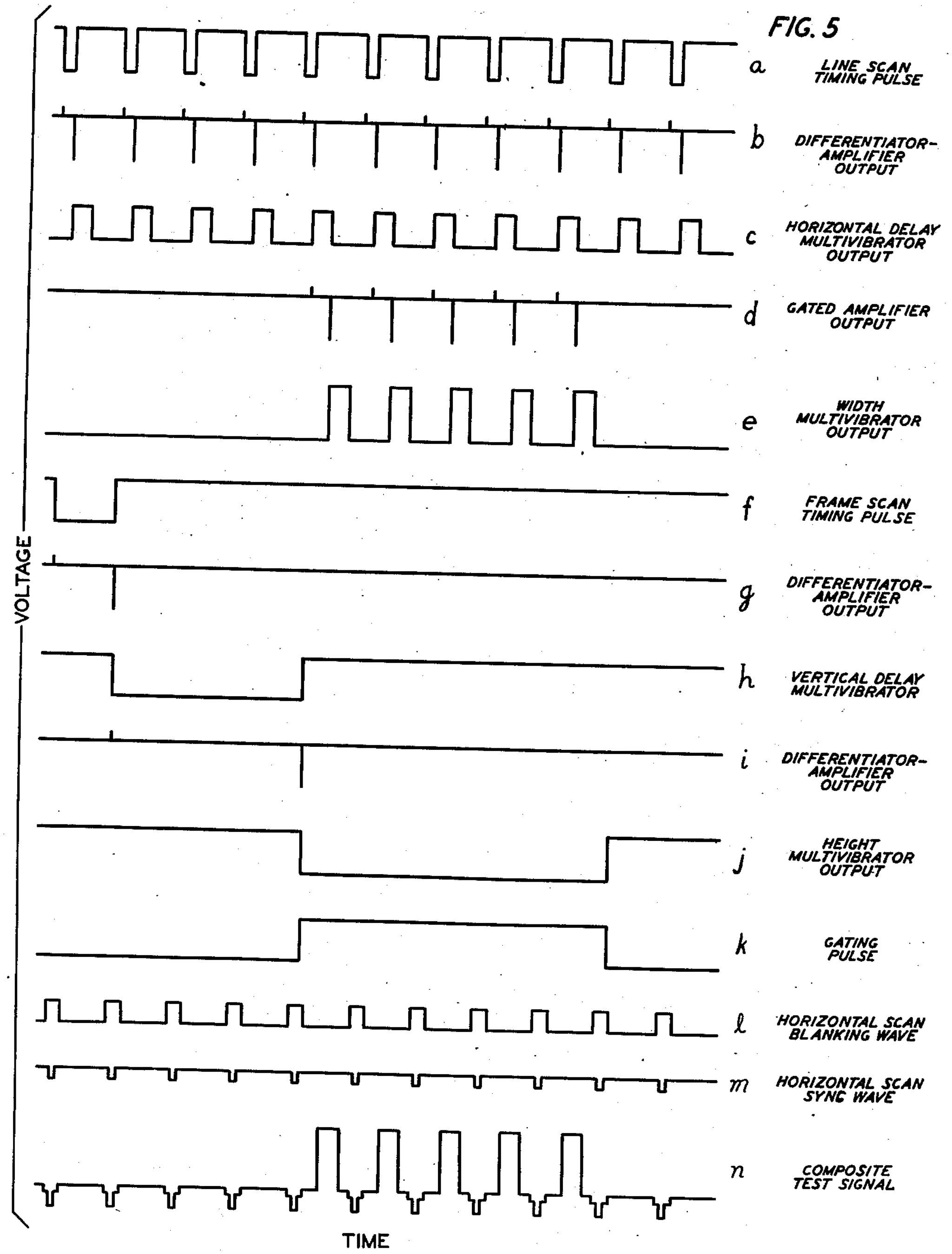
Fig. 5 is a graphical illustration used in explaining the manner in which the test signal is formed in the embodiment of Fig. 4.
Figure 7A:
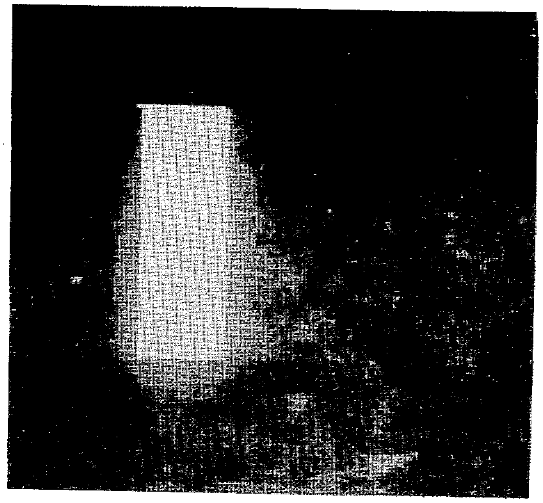
Fig. 7 constitutes photographs of the oscilloscope screen illustrating the manner in which characteristic transmission irregularities are displayed.
Figure 7B:
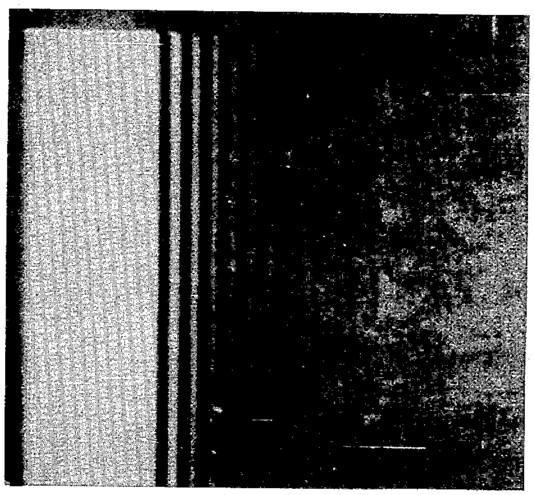
Figure 7C:
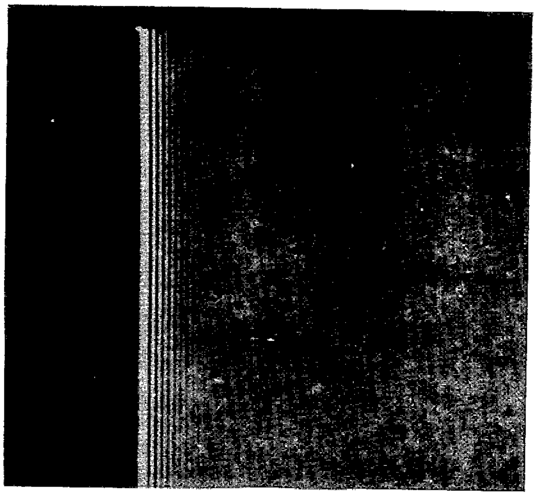
Figure 7D:
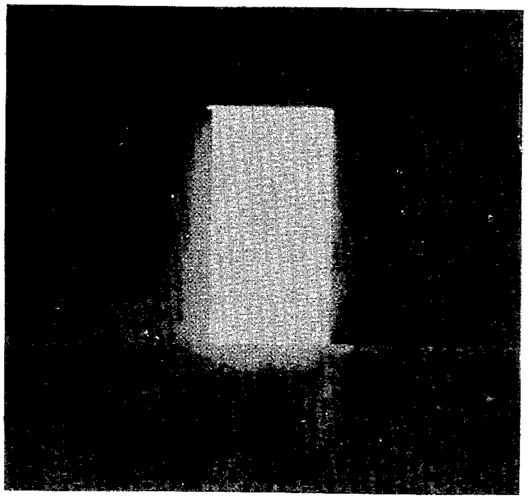

With reference again to Fig. 4, the operation of the signal generator will be described with reference to the waveforms illustrated in Fig. 5 in order to more clearly demonstrate the function of each stage in the formation of the desired composite test signal.

The picture pulses are formed by a picture pulse channel 31 controlled by the line timing pulses represented by curve *a* which are supplied to an input jack 32. The line timing pulses drive a differentiator-amplifier 33, comprising a resistor-condenser combination, such as is well known in the art, and a vacuum tube amplifier. The output of the differentiator-amplifier 33 consists of a series of sharp voltage pulses such as is shown in curve *b* in which the negative pulses correspond in time phase to the lagging edge of the input pulse. These negative pulses are utilized to control a non-oscillatory multivibrator 34, which may preferably be of the design disclosed in Fig. 3. The output of the multivibrator 34 consists of a series of pulses having an essentially rectangular waveform, such as is represented by curve *c*, and having a duration which is determined by the interval control of the multivibrator. This series of pulses is differentiated by a differentiator 35 and amplified and inverted by a gated amplifier 36. As shown in curve *d*, the output of the amplifier 36 consists of a series of sharp voltage pulses in which the negative pulses correspond in time phase to the lagging edges of the driving pulses and occurring only during the period when the amplifier is activated by a gating voltage. The output of amplifier 36 controls a multivibrator 37 to produce the series of pulses represented by curve *e* in a manner similar to that of multivibrator 34. It will be seen that the duration of the individual pulses of the series finally produced determines the width of the picture area while the time interval corresponding to the time phase between the line timing pulses determines the horizontal positioning of the picture area. Hence, the width, i. e. dimension L1, of the picture area 3 of Fig. 2 may be controlled by the variation of the interval control of the width multivibrator 37 while the horizontal positioning, i. e. dimension L3, of the picture area may be controlled by the variation of the interval control of the horizontal delay multivibrator 34.

The gating or bias pulse which is applied to the gated amplifier 36 to control the frame interval during which the picture pulses are formed is generated by a control channel 38 which is in turn controlled by the frame timing pulses of curve *f* supplied to an input jack 39. The frame timing pulses drive a differentiator-amplifier 40 to produce a series of sharp voltage pulses such as is shown in curve *g*, in which the negative pulses correspond in time phase to the lagging edge of the input voltage pulse. These negative pulses are utilized to control a non-oscillatory multivibrator 41 similar to the horizontal delay multivibrator 34 but having circuit constants appropriate for the reduced repetition rate. The output of multivibrator 41 consists of a series of pulses having an essentially rectangular waveform, as is represented by curve *h*, and having a duration which is determined by the internal control of the multivibrator. These rectangular pulses are utilized to drive a differentiator-amplifier 42 which produces a series of sharp voltage pulses in which the negative pulses correspond in time phase to the lagging edges of the driving pulses as shown by curve *i*. The output of the differentiator-amplifier 42 controls a multivibrator 43, similar to multivibrator 41, to produce a series of pulses having an essentially rectangular waveform as is shown by curve *j*. These output pulses are amplified and inverted by an amplifier 44 to form the gating signal of curve *k*, which controls the picture pulse amplifier 36. It will thus be seen that the duration of the gating pulse of curve *k* will determine the number of horizontal scanning lines in which the picture pulses for one frame are generated and that the time phase between the frame timing pulse and the gating pulse will determine the particular horizontal scanning lines in which the picture pulses are generated. Hence, the height, i. e. dimension L2, of the picture area 3 of Fig. 2 may be controlled by variation of the interval control of the height multivibrator 43 while the vertical positioning, i. e. dimension L4, of the picture area may be controlled by variation of the interval control of the vertical delay multivibrator 41.

The gated picture pulses from the width multivibrator 37 represented by the curve *e*, the horizontal blanking pulses from the auxiliary control signal generator represented by curve *l*, and the horizontal synchronizing pulses represented by the curve *m* are combined into a single composite test signal by a mixer stage 45. Briefly stated, the mixer stage serves to combine the aforementioned pulses in the proper phase relationships and amplitude levels so as to produce a composite test signal of standard waveform.

The series of blanking pulses from the auxiliary control signal generator are conducted to the mixer stage 45 through a jack 46 and a concentric transmission line 47. The voltage pulses are impressed through an isolating condenser 48 and a potentiometer 49 upon a cathode 50 of tube T4. The potential level of the cathode 50 is determined by the potentiometer 49 and a cathode dropping resistor 51 so that the magnitude of the cathode potential variations produced by the impressed voltage pulses is determined by the adjustment of the potentiometer 49. Grid 52 of tube T4 is connected to ground through an anti-sing resistor 53 so that variations in the cathode potential will be translated into potential variations at an anode 54 of tube T4 by reason of the variation in the voltage drop through anode coupling resistor 55. Since the input pulses were applied to the cathode 50, it will be seen that these potential variations will be essentially in phase with the input voltage pulses. A screen grid 56 of tube T4 is connected through a dropping resistor 57 to the positive pole of a common source of high voltage, represented in the drawing by the designation B+. Connection to the negative pole of the high voltage source is indicated by the ground connection.

The series of synchronizing pulses from the auxiliary control signal generator are conducted to the mixer stage 45 through a jack 58 and a concentric transmission line 59. The voltage pulses are impressed through an isolating condenser 60 and an anti-sing resistor 61 upon a control grid 62 of one section of tube T5. The bias potential upon the control grid 62 is determined by a resistor 63 and a potentiometer 64 connected through a grid resistor 65 to the anti-sing resistor 61. The potential of the cathode 66 of tube T5 is determined by a dropping resistor 67 and a cathode resistor 68. A cathode by-pass condenser 69 serves to prevent rapid variations in the cathode potential. The variation of the potential of the control grid 62 of tube T5 caused by the impressed synchronizing pulses produces similar potential variations at the anode 70 by reason of the varying current through resistor 55. Since the potential variations produced at the anode 70 of tube T5 are reversed in polarity with respect to the input synchronizing pulses, it will be seen that these potential variations will add to the potential variations produced by the input blanking pulses applied through tube T4.

The series of picture pulses generated by the width multivibrator 37 are applied to a control grid 71 of a second triode section of tube T5 through a condenser 98. The grid circuit of tube T5 in combination with the diode composed of an anode 75 and a cathode 76 of tube T6, a resistor 72, a potentiometer 73, a voltage source 74, and the coupling condenser 98 acts as a clipper. It serves to allow only the more positive portions of the picture pulses generated by the width multivibrator 37 to be amplified by the second triode section of tube T5. The diode conducts only during the period when the picture pulses are most negative thereby producing a voltage across condenser 98 equal in amplitude to the voltage from the most negative part of the picture pulses to the average value of the picture pulses. This process of direct current insertion and clipping maintains a constant amplitude of picture pulses in the plate circuit of tube T5 for a varying width of the picture pulses.

The application of the positive picture pulses to the grid 71 of tube T5 causes a corresponding increase in the current drawn by an anode 78 from a cathode 77 thereby increasing the voltage drop through a plate coupling resistor 79 which is connected to the common plate coupling resistor 55. Thus the amplitude of the picture pulses across resistors 79 and 55 is determined by the setting of the potentiometer 73. Since the voltage drop across the coupling resistor varies in accordance with the impressed synchronizing and blanking voltage pulses, it will be seen that the potential variation at the anode 78 has a wave form which is a composite of the synchronizing, blanking, and picture pulses. This composite wave or signal is represented by curve 80.

The composite signal formed at the anode 78 of tube T5 is applied through a coupling condenser 81 to a control grid 82 of tube T7. Coupling condenser 81, resistor 84, and anode 85 and cathode 86 of tube T6 constitute a direct current insertion circuit. Here the diode conducts during the most positive portions of the composite signal producing a voltage across condenser 81 equal in amplitude to the difference between the most positive part of the composite signal and the average value. Thus, regardless of the width of the picture signal, the amplitudes of the synchronizing pulses will be fixed at the zero bias level of tube T7 and the portion of the picture signal at a maximum potential difference from the zero bias level will extend into the cut-off portion of the grid characteristic of tube T7 and be clipped.

The potential variations of the control grid 82 produced by the resultant composite signal causes a variation in the current drawn by an anode 87 of tube T7 and a consequent variation in the voltage drop across a plate coupling resistor 88 connected between the anode 87 and the positive pole of the source of anode potential. A coupling condenser 89 serves to impress the potential variations of the anode 87 upon an output level potentiometer 90, whence the signal is conducted through a transmission line 92 to an output jack 93. The output level potentiometer 90 and a resistor 91 act as a characteristic impedance termination of the transmission line 92.

It will be noted that due to the inverting action of tube T7 and the associated circuits, the signal at the output jack 93 is reversed in phase with respect to the composite signal formed at the anode 78 of tube T5. This inversion is accomplished only to provide a composite test signal having polarity characteristics in accordance with the standard television practice and technique. The final composite signal is represented by curve $n$ of Fig. 5.

Figure 6:
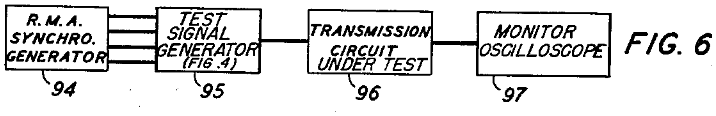
Fig. 6 is a schematic diagram illustrating the manner in which the invention is utilized in the testing of transmission circuits.

There is shown in Fig. 6 a schematic diagram of the manner in which the specific embodiment of the test signal generator of the invention would be utilized in the testing of transmission circuits. An auxiliary control signal generator 94 adapted to supply the necessary horizontal blanking and synchronizing pulses, the line timing pulses, and the frame timing pulses controls a test signal generator 95. The composite test signals are applied to a transmission circuit under test 96 and the transmitted signals displayed upon the face of a cathode ray tube of a monitoring oscilloscope 97. The operator may then by an adjustment of the characteristics of the test signal, determine the irregularities of the transmission circuit by observing the distortions of the picture area.

The photographs of Fig. 7 illustrate the manner in which typical transmission irregularities appear upon the face of the cathode ray monitor tube used in the practice of the invention. The results shown were obtained in the utilization of the embodiment of the invention shown in Fig. 4 having 525 horizontal scanning lines per frame and RMA standard synchronizing and blanking signals.

Fig. 7($a$) shows the picture obtained by passing the test signal through a network having good transmission characteristics. The picture area is of uniform brightness and sharply defined while the picture field is essentially uniform in shade. The slight variation in shading of the picture field and the barely perceptible horizontal lines at the top and bottom of the picture area indicate a small amount of phase distortion.

Fig. 7($b$) illustrates the effect produced by a transmission network having inadequate transient response. The picture shown is for a low-pass filter having an upper cut-off frequency of 330 kilocycles and with the picture width adjusted for maximum echo or transient indication. It will be noted that the fuzziness along the left side of the picture area indicates poor response to the leading edge of the picture pulse and that the transient oscillations indicated by the vertical bars to the right of the picture area occur for a relatively wide picture area.

Fig. 7($c$) illustrates the response of a transmission network having an upper cut-off frequency of 1 megacycle. As shown in the photograph, a very narrow picture area is necessary in order to produce the vertical transient bars.

Fig. 7($d$) illustrates the effect upon the test picture produced by phase distortion in the transmission network. Thus, the horizontal bar above the picture area is of different brightness than the horizontal bar below the picture area, indicating phase distortion at frame scanning frequency. Very severe phase distortion at frame frequency is indicated by shading from gray along the top portion of the top horizontal bar or upper edge of the picture field to light gray at the upper edge of the picture area. The areas at either side of the picture area vary in shade from the light gray or maximum brightness at the upper edge of the picture area to black or minimum brightness at the lower edge of the picture area while the lower horizontal bar varies from black at the lower edge of the picture area to gray at the lower edge of the picture field. Phase distortion at line scanning frequency appears as a variation in the shading across the picture field.

While the invention has been described and illustrated in connection with one specific embodiment of the test signal generator, it will be realized that many embodiments are possible within the spirit of the invention. By way of example, the necessity of an auxiliary control signal generator which supplies separate line and frame timing pulses might be eliminated by the use of the differentiator circuits in connection with the usual source of horizontal and vertical synchronizing and blanking signals.

It is further to be understood that while the invention has been described primarily in connection with the testing of circuits intended for the transmission of television signals, it is by no means limited to such use. The invention may be useful in the testing of circuits intended to be utilized for the transmission of signals having a wide frequency spectrum and particularly those in which intelligence is conveyed by means of energy pulses.

What is claimed is:

1. In a signal generator for producing a composite television picture signal which is capable of producing on the screen of a cathode ray tube a rectangular picture area of one shade upon a picture field of another shade, means supplying a first series of pulses having the repetition rate of line scanning frequency, means supplied with said first series of pulses for producing a second series of equal pulses having the line repetition rate and whose leading edges substantially coincide with the leading edges of the pulses of said first series, means supplying a third series of pulses having the repetition rate of frame scanning frequency, means supplied with said third series of pulses for producing a fourth series of equal pulses having the frame repetition rate and whose leading edges substantially coincide with the leading edges of the pulses of said third series, means supplied with the fourth series of pulses and actuated by the trailing edges of said pulses for forming a fifth series of equal pulses having the frame repetition rate, gating means supplied with the second series of pulses and controlled by the fifth series of pulses for forming during each of the pulses of said fifth series a sixth series of equal pulses of line repetition rate with leading edges which substantially coincide with the trailing edges of the pulses of the second series, and mixing means supplied with said first, third, and sixth series of pulses for producing the desired composite television signal.

2. In a testing system, a signal generator according to claim 1 for producing a testing signal, a transmission circuit to be tested, means for supplying said testing signal to said transmission circuit for deriving a test output, and a cathode ray device supplied with said test output.

3. In a signal generator for producing a composite television picture signal which is capable of producing on the screen of a cathode ray tube a rectangular picture area of one shade on a picture field of a second shade, said picture area being displaced horizontally from the starting side of the picture field by a first time interval and vertically from the top of the picture field by a second time interval and having a height representative of a third time interval and a width representative of a fourth time interval, means supplying a first series of pulses having the repetition rate of line scanning frequency, means initiated by the leading edge of each pulse of said first series of pulses for forming a second series of pulses of line repetition rate and of a duration of the first time interval, means supplying a third series of pulses having the repetition rate of frame scanning frequency, means initiated by the leading edge of each of the pulses of said third series for forming a fourth series of pulses of frame repetition rate and of a duration of the second time interval, means initiated by the trailing edges of the pulses of said fourth series for forming a fifth series of pulses of frame repetition rate and of a duration of the third time interval, gating means supplied with the second series of pulses and controlled by the fifth series of pulses for forming during each of the pulses of said fifth series a sixth series of pulses of line repetition initiated by the trailing edges of the pulses of the second series and of a duration of the fourth time interval, and mixing means supplied with said first, third and sixth series of pulses for producing the desired composite television signal.

4. In a testing system, a signal generator according to claim 3 for producing a testing signal, a transmission circuit to be tested, means for supplying the testing signal to said circuit and deriving a test output, and a cathode ray device supplied with said test output.

STEPHEN DOBA, Jr.
JOHANNES J. JANSEN.

REFERENCES CITED

The following references are of record in the file of this patent:

UNITED STATES PATENTS

| Number | Name | Date |
|---|---|---|
| 1,706,538 | Mertz | Mar. 26, 1929 |
| 2,162,827 | Schrader | June 20, 1939 |
| 2,166,688 | Kell | July 18, 1939 |
| 2,183,966 | Lewis | Dec. 19, 1939 |
| 2,203,750 | Sherman | June 11, 1940 |
| 2,226,706 | Cawein | Dec. 31, 1940 |
| 2,231,829 | Lewis | Feb. 11, 1941 |
| 2,236,705 | Campbell | Apr. 1, 1941 |
| 2,284,219 | Loughren | May 26, 1942 |
| 2,310,328 | Swift | Feb. 9, 1943 |
| 2,416,290 | Depp | Feb. 25, 1947 |
| 2,443,603 | Crost | June 22, 1948 |

FOREIGN PATENTS

| Number | Country | Date |
|---|---|---|
| 520,349 | Great Britain | Apr. 22, 1940 |

OTHER REFERENCES

Duke, Reprint from RCA Review, vol. VI, No. 2, October 1941, pages 190–201.

Radio News, Jan. 1944, pages 24, 25, 78, 80, 82.

Electronics, June 1946, pages 130–135.